United States Patent
Heo et al.

(10) Patent No.: US 8,957,661 B2
(45) Date of Patent: Feb. 17, 2015

(54) DC-DC CONVERTER WITH MODULATION MODE SWITCH

(75) Inventors: Sewan Heo, Daejeon (KR); Yil Suk Yang, Daejeon (KR); Jong Kee Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 13/609,670

(22) Filed: Sep. 11, 2012

(65) Prior Publication Data

US 2013/0093407 A1 Apr. 18, 2013

(30) Foreign Application Priority Data

Oct. 12, 2011 (KR) .................. 10-2011-0104117

(51) Int. Cl.
 *G05F 1/56* (2006.01)
 *H02M 3/156* (2006.01)
 *H02M 1/00* (2006.01)

(52) U.S. Cl.
 CPC ............ *H02M 3/156* (2013.01); *H02M 3/1563* (2013.01); *H02M 2001/0006* (2013.01); *H02M 2001/0035* (2013.01); *Y02B 70/16* (2013.01)
 USPC .............................. 323/290; 323/284; 323/285

(58) Field of Classification Search
 USPC .......................................... 323/266, 282–290
 See application file for complete search history.

(56) References Cited

U.S. PATENT DOCUMENTS

| | | | |
|---|---|---|---|
| 5,825,165 A | 10/1998 | Kitching et al. | |
| 7,221,130 B2 | 5/2007 | Ribeiro et al. | |
| 2009/0315523 A1 | 12/2009 | Kumagai et al. | |
| 2010/0188061 A1 | 7/2010 | Ma et al. | |
| 2011/0084677 A1* | 4/2011 | Shi et al. | 323/284 |
| 2011/0148374 A1* | 6/2011 | Gizara | 323/282 |
| 2011/0221407 A1* | 9/2011 | Kato | 323/271 |
| 2012/0038341 A1* | 2/2012 | Michishita et al. | 323/284 |
| 2012/0112716 A1* | 5/2012 | Chen | 323/271 |
| 2012/0119720 A1* | 5/2012 | Li | 323/284 |
| 2012/0126768 A1* | 5/2012 | Ishino | 323/283 |
| 2012/0153919 A1* | 6/2012 | Garbossa et al. | 323/284 |
| 2012/0153922 A1* | 6/2012 | Chen et al. | 323/288 |
| 2012/0161728 A1* | 6/2012 | Chen et al. | 323/271 |
| 2012/0182003 A1* | 7/2012 | Flaibani et al. | 323/284 |
| 2012/0249106 A1* | 10/2012 | Wu | 323/288 |

FOREIGN PATENT DOCUMENTS

| | | |
|---|---|---|
| JP | 2003-219637 A | 7/2003 |
| KR | 10-2009-0054161 A | 5/2009 |

* cited by examiner

*Primary Examiner* — Adolf Berhane
*Assistant Examiner* — Nusrat Quddus
(74) *Attorney, Agent, or Firm* — Rabin & Berdo, P.C.

(57) ABSTRACT

Disclosed is a DC-DC converter, including: a switch unit configured to generate output voltage for driving a load; an output voltage monitoring unit including a reference voltage generator generating reference voltage and a reference voltage capacitor maintaining the reference voltage when power of the reference voltage generator is interrupted and configured to generate a signal for setting the output voltage as the reference voltage; a switch controlling unit configured to control the switch unit by being operated in a pulse width modulation (PWM) mode or a pulse frequency modulation (PFM) mode by using the signal of the output voltage monitoring unit; and a mode determining and power interrupting unit configured to set an operating mode of the switch controlling unit as the PWM mode or the PFM mode according to a magnitude of the load and interrupt power of the reference voltage generator when operated in the PFM mode.

10 Claims, 6 Drawing Sheets

DC-DC CONVERTER WITH MODULATION MODE SWITCH

CROSS-REFERENCE TO RELATED APPLICATIONS

This application is based on and claims priority from Korean Patent Application No. 10-2011-0104117, filed on Oct. 12, 2011, with the Korean Intellectual Property Office, the disclosure of which is incorporated herein in its entirety by reference.

TECHNICAL FIELD

The present disclosure relates to a DC-DC converter, and more particularly, to a DC-DC converter which uses a PWM mode when a load is large, uses a PFM mode when the load is small and has the PFM mode of ultra-low power that can minimize operating power by interrupting unnecessary power of an internal device when operated in the PFM mode.

BACKGROUND

A DC-DC converter, as a power supply device for supplying voltage constantly regardless of the size of a load, which generates output voltage completely different from input voltage in order to supply voltage which the load desires and maintains the output voltage constantly regardless of fluctuation in the input voltage.

The DC-DC converter is various in a configuration and an operating mode thereof. In general, the DC-DC converter uses a transformer which is capable of changing voltage by using a winding rate of a coil. However, in an application field in which voltage is relatively low, a DC-DC converter integrated by an IC is used. In addition, the operating mode of the DC-DC converter is determined by configuring topology such as a buck, a boost, or a buck-boost by determining a connection configuration of a switch and a transformer or an inductor constituted by transistors according to the relationship between magnitudes of the input and output voltages.

Meanwhile, as a method of controlling the switch, a pulse width modulation (PWM) mode is most widely used. In this mode, as the switch is operated in synchronization with a clock having a predetermined cycle, which is given inside or outside, and energy stored in an inductor is repeatedly increased and decreased periodically, and as a result, power is transferred from an input to an output. In this mode, the output can be stabilized to a desired value by repeatedly turning on and off the switch at all times during synchronization with the clock, that is effective under a condition that it is difficult to maintain the output voltage when the load is large.

On the contrary, a pulse frequency modulation (PFM) mode is a mode of operating the switch only when necessary without continuously turning on and off the switch in synchronization with the clock is. When the PWM mode is used in the case where the load is small, power is consumed by unnecessarily turning on and off the switch, and as a result, conversion efficiency of the DC-DC converter is decreased. Accordingly, the PFM mode is effective, which operates the switch only when necessary in order to increase the conversion efficiency when the load is not large.

The PWM mode and the PFM mode have an advantage and a disadvantage complementarily. That is, in the PWM mode, it is effective to maintain constant voltage when the load is large, but unnecessary power consumption is generated when the load is small. On the contrary, in the PFM mode, it is effective to increase the conversion efficiency because the switch is not unnecessarily turned on/off when the load is small, but it is difficult to stabilize the output voltage when the load is large. Therefore, it is necessary to selectively use the PWM mode and the PFM mode according to the load in order to obtain high conversion efficiency regardless of a magnitude of the load. If the magnitude of the load is very small for most of the time in terms of an operating characteristic of the load, a scheme of minimizing power in the PFM mode is required.

To this end, in the existing DC-DC converter, the PWM mode and the PFM mode are automatically converted or unnecessary power consumption is reduced while operating in the PFM mode. However, in the existing DC-DC converter, a case in which both characteristics are satisfied is not common, and when the load is rapidly increased after the load is very small for a long period of time, a DC-DC converter device in which an ultra-low power PFM mode is automatically changed to a general PWM mode is required.

SUMMARY

The present disclosure has been made in an effort to provide a DC-DC converter that can operate in an ultra-low power PFM mode for a load which is maintained to be small and operate by automatically changing the PFM mode into a PWM mode as the load increases.

The present disclosure also has been made in an effort to provide a DC-DC converter that can reduce power consumption by interrupting unnecessary power of an internal device in the PFM mode.

An exemplary embodiment of the present disclosure provides a DC-DC converter including: a switch unit configured to generate output voltage for driving a load; an output voltage monitoring unit including a reference voltage generator generating reference voltage and a reference voltage capacitor maintaining the reference voltage when power of the reference voltage generator is interrupted and configured to generate a signal for setting the output voltage as the reference voltage; a switch controlling unit configured to control the switch unit by being operated in a pulse width modulation (PWM) mode or a pulse frequency modulation (PFM) mode by using the signal of the output voltage monitoring unit; and a mode determining and power interrupting unit configured to set an operating mode of the switch controlling unit as the PWM mode or the PFM mode according to a magnitude of the load and interrupt power of the reference voltage generator when operated in the PFM mode.

As described above, according to the present disclosure, by a DC-DC converter that can automatically change an operating mode into a PWM mode or a PFM mode depending on a magnitude of a load and interrupts unnecessary power of an internal device while operating in the PFM mode, it is possible to provide a DC-DC converter that maintains output voltage with low power consumption even when a load is continuously very small.

By providing a DC-DC converter that interrupts even power of a reference voltage generator while operating in the PFM mode, it is possible to provide a DC-DC converter which can minimize the power consumption while operating in the PFM mode and is operated with ultra-low power in a low load.

The foregoing summary is illustrative only and is not intended to be in any way limiting. In addition to the illustrative aspects, embodiments, and features described above, fur-

DETAILED DESCRIPTION

In the following detailed description, reference is made to the accompanying drawing, which form a part hereof. The illustrative embodiments described in the detailed description, drawing, and claims are not meant to be limiting. Other exemplary embodiments may be utilized, and other changes may be made, without departing from the spirit or scope of the subject matter presented here.

Hereinafter, exemplary embodiments of the present disclosure will be described in detail with reference to the accompanying drawings. In describing the present disclosure, well-known functions or constructions will not be described in detail since they may unnecessarily obscure the understanding of the present disclosure.

Figure 1:
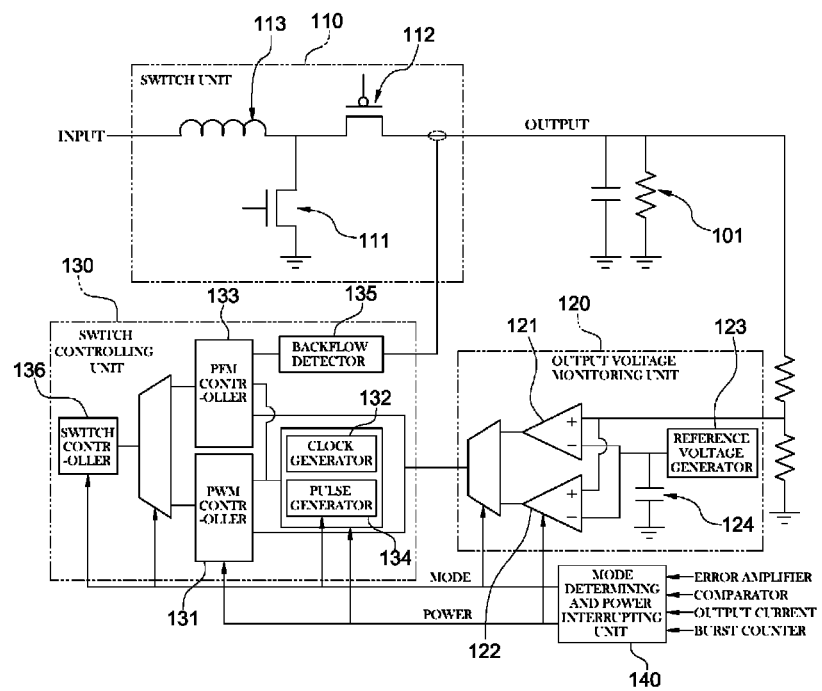
FIG. 1 is a diagram illustrating a configuration of a DC-DC converter according to an exemplary embodiment of the present disclosure.

FIG. 1 is a diagram illustrating a configuration of a DC-DC converter according to an exemplary embodiment of the present disclosure.

Referring to FIG. 1, the DC-DC converter (DC to DC converter) according to the present disclosure includes a switch unit 110, an output voltage monitoring unit 120, a switch controlling unit 130, and a mode determining and power interrupting unit 140.

The switch unit 110 stores energy acquired from an input in an inductor 113 and thereafter, transmits the stored energy to an output by turning on/off a first switch 111 and a second switch 112 to generate output voltage. In this case, the switch unit 110 is continuously operated according to a control by the switch controlling unit 130 so that the output voltage is not decreased by a load 101.

The switch unit 110 is constituted by two switches 111 and 112 and one inductor 113 to configure boost topology in FIG. 1, but the switch unit 110 is not limited thereto. The switch unit 110 includes a plurality of switches and the inductor to be configured as buck or buck-boost topology.

The output voltage monitoring unit 120 generates a signal for setting the output voltage to reference voltage. To this end, the output voltage monitoring unit 120 includes an error amplifier 121, a comparator 122, a reference voltage generator 123 and a reference voltage capacitor 124.

The error amplifier 121 as a device that amplifies a difference value between the output voltage and the reference voltage amplifies the difference value between the output voltage in which a magnitude of voltage is decreased as large as a magnitude rate of a resistance 101 and the reference voltage generated by the reference voltage generator 123, and generates a signal indicating the amplified difference value. In detail, the error amplifier 121 generates a signal having a large magnitude when the difference between the output voltage and the reference voltage is large and a signal having a small magnitude when the difference between the output voltage and the reference voltage is small.

The comparator 122 is a device that performs a simple voltage comparing operation with lower power consumption than the error amplifier 121, and generates a signal by comparing the magnitudes of the output voltage and the reference voltage generated by the reference voltage generator 123. For example, the comparator 122 generates a "High" signal when the output voltage is lower than the reference voltage and a "Low" signal when the output voltage is lower than the reference voltage. On the contrary, the comparator 122 may be set to generate the "Low" signal when the output voltage is lower than the reference voltage and the "High" signal when the output voltage is lower than the reference voltage.

The reference voltage generator 123 is a device that generates constant voltage regardless of the input voltage, the output voltage and a temperature and generates the reference voltage.

The reference voltage capacitor 124 serves to provide the reference voltage even though the reference voltage is not generated from the reference voltage generator 123 when power of the reference voltage generator 123 is interrupted while operating in a pulse frequency modulation (PFM) mode.

The switch controlling unit 130 controls the switch unit 110 in a pulse width modulation (PWM) mode or the PFM mode by using the signal generated from the output voltage monitoring unit 120. To this end, the switch controlling unit 130 includes a PWM controller 131, a clock generator 132, a PFM controller 133, a pulse generator 134, a backflow detector 135 and a switch controller 136. In this case, the PWM controller 131 and the clock generator 132 are used in the PWM mode, and the PFM controller 133, the pulse generator 134 and the backflow detector 135 are used in the PFM mode.

The PWM controller 131 allows the switch controller 136 to control the switch unit 110 every clock signal of the clock generator 132 and in this case, determines a switch on/off time rate according to the magnitude of the signal of the error amplifier 121 of the output voltage monitoring unit 120. For example, the PWM controller 131 maintains an opening time of the first switch 111 to be longer than an opening time of the second switch 112 when the magnitude of the signal of the error amplifier 121 is large (that is, when the difference between the output voltage and the reference voltage is large) and maintains the opening time of the second switch 112 to be longer than the opening time of the first switch 111 when the magnitude of the signal of the error amplifier 121 is small (that is, when the difference between the output voltage and the reference voltage is small).

The clock generator 132 generates a clock signal having a constant cycle. The PWM controller 131 turns on/off the switch unit 110 according to the clock signal.

The PFM controller 133 allows the switch controller 136 to control the switch unit 110 so as to maintain the output voltage as the reference voltage according to a pulse signal generated by the pulse generator 134. That is, the PFM controller 133 operates the switch unit 110 when the output voltage is lower than the reference voltage and does not operate the switch unit 110 when the output voltage is higher than the reference voltage, thereby maintaining the output voltage as the reference voltage. In this case, a section in which the switch unit 110 is operated becomes a burst section, and a section in which the switch unit 110 does not operate becomes an idle section. Therefore, the PFM mode is largely divided into the burst section and the idle section.

The pulse generator 134 generates the pulse signal according to the signal of the comparator 122 of the output voltage monitoring unit 120. For example, the pulse generator 134 generates the pulse signal when receiving the "High" signal from the comparator 122 and does not generate the pulse signal when receiving the "Low" signal from the comparator 122. On the contrary, the pulse generator 134 may be set to generate the pulse signal when receiving the "Low" signal from the comparator 122 and not to generate the pulse signal when receiving the "High" signal from the comparator 122.

The backflow detector 135 detects current that flows back from an output of the switch unit 110 to the switch unit 110.

The switch controller 136 controls the switch unit 110 in the PWM mode or the PFM mode by a control of the PWM controller 131 or the PFM controller 133.

The mode determining and power interrupting unit 140 sets the operating mode of the switch controlling unit 130 as the PWM mode or the PFM mode according to the magnitude of the load 101. That is, the mode determining and power interrupting unit 140 changes the operating mode of the switch controlling unit 130 to the PFM mode in the case where current transferred to the load 101, that is, the amount of output current is equal to or less than a predetermined value when the switch controlling unit 130 is operated in the PWM mode. The mode determining and power interrupting unit 140 changes the operating mode of the switch controlling unit 130 to the PWM mode in the case where a burst counter value meaning the number of continuous operation times of the switch within one burst is equal to or more than a predetermined value due to an increase in output current when the switch controlling unit 130 is operated in the PFM mode.

The DC-DC converter according to the present disclosure uses the error amplifier 121 and the PWM controller 131 in the PWM mode, uses the comparator 122, the PFM controller 133 and the backflow detector 135 in the burst section of the PFM mode, and does not use most of the internal devices used in the PWM mode and the burst section of PFM mode in the idle section of the PFM mode.

Therefore, the mode determining and power interrupting unit 140 interrupts power of the internal devices which are not used while operated in each mode in order to increase the conversion efficiency. In detail, the mode determining and power interrupting unit 140 interrupts power of the comparator 122, the PFM controller 133, the backflow detector 135 and the pulse generator 134 in the PWM mode, interrupts power of the error amplifier 121, the PWM controller 131 and the clock generator 132 in the burst section of the PFM mode and interrupts power of the error amplifier 121, the PWM controller 131, the PFM controller 133, the backflow detector 135, the clock generator 132, the pulse generator 134 and the reference voltage generator 123 in the idle section of the PFM mode. In this case, even though the mode determining and power interrupting unit 140 interrupts the power of the reference voltage generator 123 in the idle section of the PFM mode, the reference voltage capacitor 124 normally operates the comparator 122 by maintaining the reference voltage constantly, thereby additionally reducing power consumption.

Figure 2:
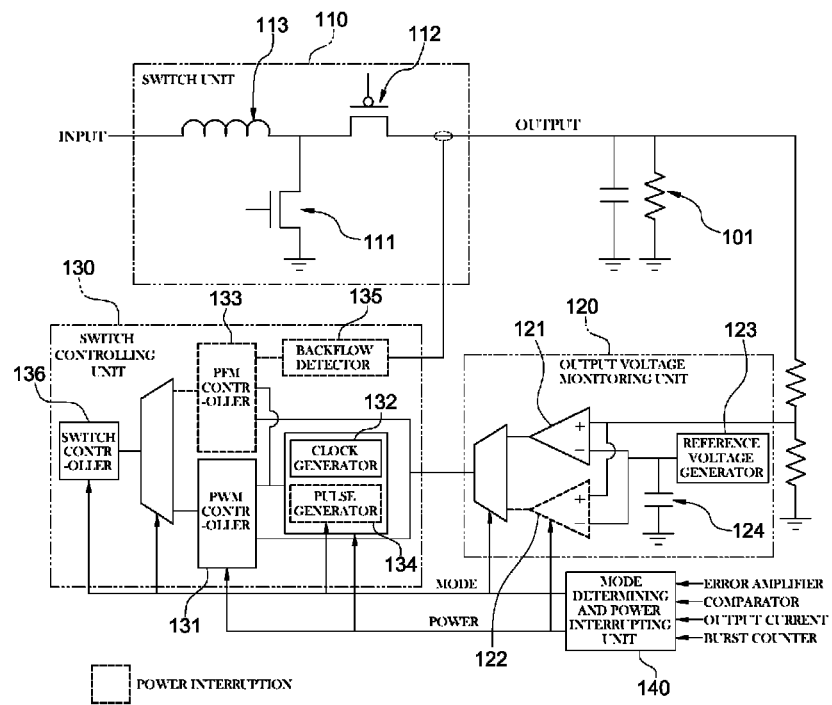
FIG. 2 is a diagram for describing an operation of the DC-DC converter according to the exemplary embodiment of the present disclosure in a PWM mode.

FIG. 2 is a diagram for describing an operation of the DC-DC converter according to the exemplary embodiment of the present disclosure in a PWM mode.

Referring to FIG. 2, the DC-DC converter according to the present disclosure is operated in the PWM mode when the load 101 is relatively large. In this case, in the DC-DC converter, the error amplifier 121 is used in order to reduce an error between the output voltage and the reference voltage, and the PWM controller 131 controls the switch unit 110 in synchronization with the clock signal of the clock generator 132 by considering the magnitude of the signal of the error amplifier 121.

The mode determining and power interrupting unit 140 increases the conversion efficiency by interrupting the power of the comparator 122, the PFM controller 133, the backflow detector 135 and the pulse generator 134.

Figure 3:
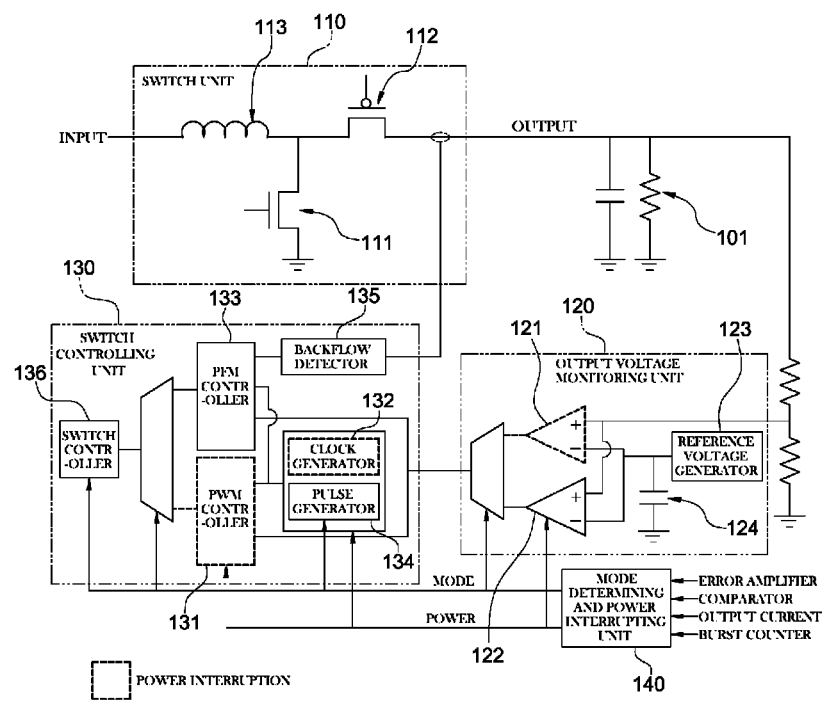
FIG. 3 is a diagram for describing an operation of the DC-DC converter according to the exemplary embodiment of the present disclosure in a burst section of a PFM mode.

FIG. 3 is a diagram for describing an operation of the DC-DC converter according to the exemplary embodiment of the present disclosure in a burst section of a PFM mode.

Referring to FIG. 3, the DC-DC converter according to the present disclosure is operated in the PFM mode when the load 101 is relatively small. In this case, in the DC-DC converter, since the load 101 is small, the comparator 122 is used instead of the error amplifier 121 that consumes a large amount of power in order to reduce the power consumption, and the PFM controller 133 and the backflow detector 135 are used instead of the PWM controller 131 in order to avoid unnecessary turning on/off of the switch. In the DC-DC converter according to the present disclosure, the PFM controller 133 controls the switch unit 110 in synchronization with the pulse signal generated only when the output voltage is decreased through not the clock generator 132 but the pulse generator 134, thereby preventing power consumption caused by an unnecessary signal.

The mode determining and power interrupting unit 140 increases the conversion efficiency by interrupting the power of the error amplifier 121, the PWM controller 131 and the clock generator 132.

Figure 4:
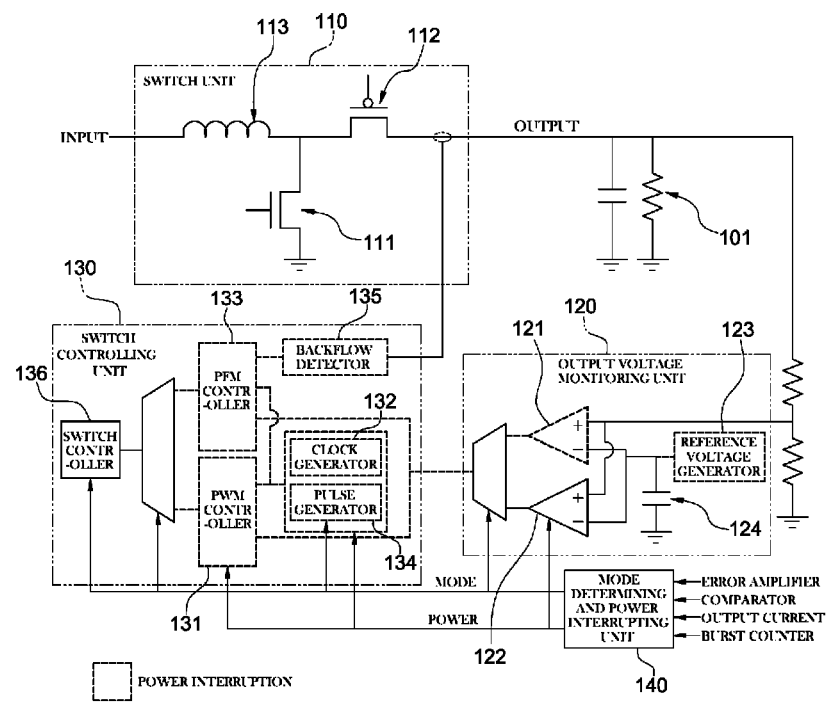
FIG. 4 is a diagram for describing an operation of the DC-DC converter according to the exemplary embodiment of the present disclosure in an idle section of the PFM mode.

FIG. 4 is a diagram for describing an operation of the DC-DC converter according to the exemplary embodiment of the present disclosure in an idle section of the PFM mode.

Referring to FIG. 4, most operations of the DC-DC converter according to the present disclosure are limited so as to maximally reduce power in the idle section of the PFM mode. In this case, in the DC-DC converter, the idle section is continued until the output voltage decreases again after the output voltage increases to approximately the reference voltage within a short time in the burst section of the PFM mode.

The mode determining and power interrupting unit 140 interrupts the unnecessary power of all internal devices, thereby increasing the conversion efficiency. That is, the mode determining and power interrupting unit 140 interrupts the power of the error amplifier 121, the reference voltage generator 123, the PWM controller 131, the clock generator 132, the PFM controller 133, the pulse generator 134 and the backflow detector 135. In this case, since the comparator 122 is required to monitor whether the output voltage decreases, the mode determining and power interrupting unit 140 does not interrupt the power of the comparator 122. Moreover, even though the power of the reference voltage generator 123 is interrupted, the reference voltage is maintained by the reference voltage capacitor 124.

Meanwhile, the mode determining and power interrupting unit 140 allows the switch controller 136 to keep turning off the switch of the switch unit 110 in the idle section of the PFM mode. In this case, the mode determining and power interrupting unit 140 increases the output voltage by changing the operating mode of the switch controlling unit 136 from the idle section to the burst section according to the signal of the comparator 122 when the idle section cannot be continued due to the decrease in output voltage. As such, the DC-DC converter according to the present disclosure is operated repeatedly in the burst section and the idle section of the PFM mode.

Figure 5:
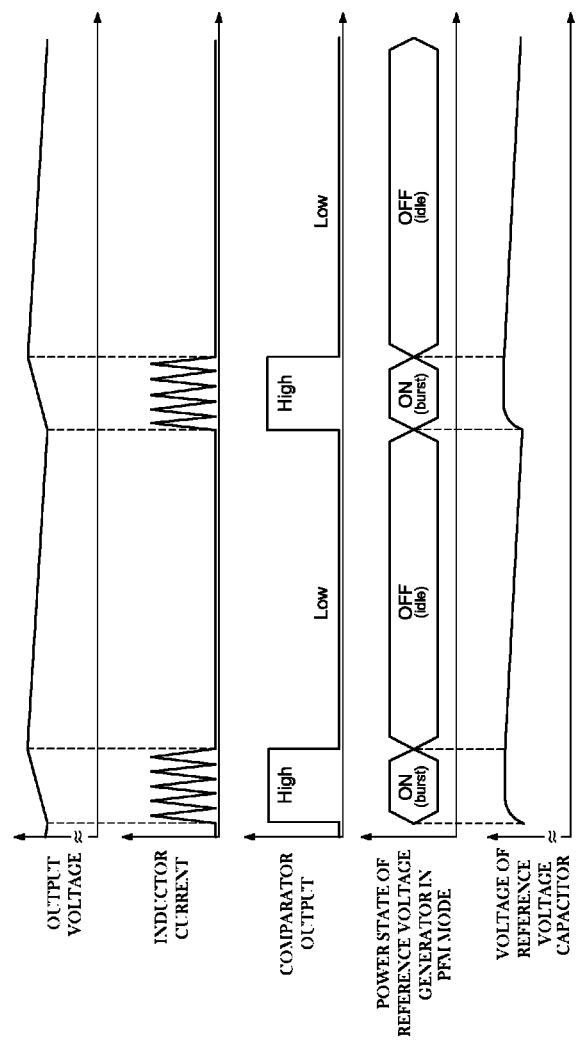
FIG. 5 is a graph illustrating a power state, reference voltage and output voltage of a reference voltage generator by a comparator in the DC-DC converter according to the present disclosure.

FIG. 5 is a graph illustrating a power state, reference voltage and output voltage of the reference voltage generator by a comparator in the DC-DC converter according to the present disclosure.

Referring to FIG. 5, the comparator 122 sends the signal to the mode determining and power interrupting unit 140 to interrupt the unnecessary power of the internal devices with the increase in output voltage, and as a result, the power of most of the internal devices including the reference voltage generator 123 except for the comparator 122 is interrupted. In this case, even though the power of the reference voltage generator 123 is interrupted, the reference voltage is constantly maintained by the reference voltage capacitor 124 in the idle section of the PFM mode to maintain the output voltage to desired voltage.

Figure 6:
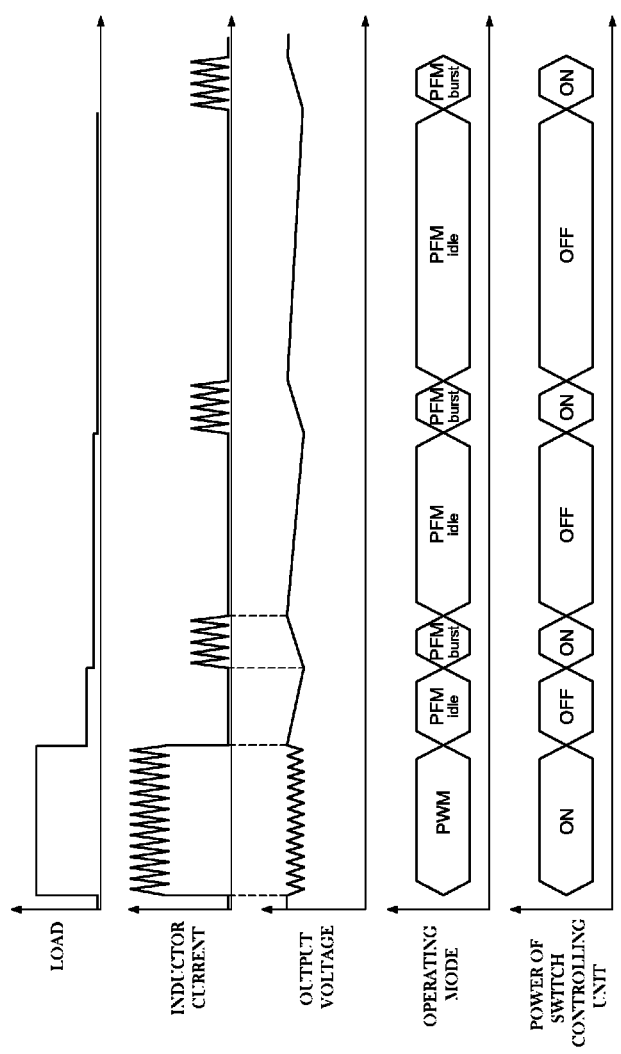
FIG. 6 is a graph illustrating an operating mode depending on a magnitude of a load, and current of an inductor and power of a switch controller for maintaining output voltage in the DC-DC converter according to the present disclosure.

FIG. 6 is a graph illustrating an operating mode depending on a magnitude of a load, and current of an inductor and power of a switch controller for maintaining output voltage in the DC-DC converter according to the present disclosure.

Referring to FIG. 6, the DC-DC converter according to the present disclosure is operated in the PWM mode in order to maintain the output voltage when the load 101 is large, and in this case, a large amount of current flows on the inductor 113. The DC-DC converter is changed to the PFM mode when the current of the inductor 113 is equal to or less than a predetermined value as the load 101 decreases. In this case, the PFM mode is divided into the burst section in which the switch unit 110 is continuously operated and the idle section in which the switch unit 110 is not operated. Herein, the burst section is an operating section for temporarily increasing the output voltage, and the idle section is a stop section for increasing the conversion efficiency by interrupting the power of the switch controlling unit 130.

In the DC-DC converter according to the present disclosure, as the load 101 decreases, a temporal rate of the idle section is relatively increased as compared with the burst section, and as a result, a power interruption effect of the switch controlling unit 130 is improved.

Accordingly, the DC-DC converter according to the present disclosure is operated in the PWM mode when the load 101 is large and operated in the PFM mode when the load 101 is small, and interrupts the power of most of the internal devices including the reference voltage generator 123 except for the comparator 122 when the load 101 is small, thereby increasing the conversion efficiency by minimizing operating power in the PFM mode.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A DC-DC converter, comprising:
a switch unit configured to generate output voltage for driving a load;
an output voltage monitoring unit including a reference voltage generator generating reference voltage and a reference voltage capacitor maintaining the reference voltage when power of the reference voltage generator is interrupted and configured to generate a signal for setting the output voltage as the reference voltage;
a switch controlling unit configured to control the switch unit by being operated in a pulse width modulation (PWM) mode or a pulse frequency modulation (PFM) mode by using the signal of the output voltage monitoring unit; and
a mode determining and power interrupting unit configured to set an operating mode of the switch controlling unit as the PWM mode or the PFM mode according to a magnitude of the load and interrupt power of the reference voltage generator when operated in the PFM mode,
wherein the output voltage monitoring unit includes an error amplifier configured to amplify a difference value between the output voltage and the reference voltage and generate a signal indicating the amplified difference value and a comparator configured to generate a signal by comparing magnitudes of the output voltage and the reference voltage.

2. The DC-DC converter of claim 1, wherein the mode determining and power interrupting unit changes the operating mode of the switch controlling unit from the PWM mode to the PFM mode when output current transferred to the load is equal to or less than a predetermined value.

3. The DC-DC converter of claim 1, wherein the mode determining and power interrupting unit changes the operating mode of the switch controlling unit from the PFM mode to the PWM mode when a burst counter value meaning the number of continuous operation times of the switch within one burst is equal to or more than a predetermined value due to the increase in output current when the switch controlling unit is operated in the PFM mode.

4. The DC-DC converter of claim 1, wherein the switch unit includes at least one switch and one inverter.

5. The DC-DC converter of claim 1, wherein the switch unit is constituted by buck, boost or buck-boost topology.

6. The DC-DC converter of claim 1, wherein the switch controlling unit includes:
a clock generator configured to generate a clock signal;
a PWM controller configured to control the switch unit according to a switch on/off time rate which is in proportion to the magnitude of the signal of the error amplifier in synchronization with the clock signal of the clock generator;
a pulse generator configured to generate a pulse signal according to the signal of the comparator;
a PFM controller configured to control the switch unit in synchronization with the pulse signal of the pulse generator; and
a backflow detector configured to detect current that flows back to the switch unit.

7. The DC-DC converter of claim 6, wherein the mode determining and power interrupting unit interrupts power of the comparator, the PFM controller, the backflow detector and the pulse generator in the PWM mode.

8. The DC-DC converter of claim 6, wherein the PFM mode is divided into a burst section in which the comparator outputs a "High" signal and an idle section in which the comparator outputs a "Low" signal.

9. The DC-DC converter of claim 8, wherein the mode determining and power interrupting unit interrupts power of the error amplifier, the PWM controller and the clock generator in the burst section of the PFM mode.

10. The DC-DC converter of claim 8, wherein the mode determining and power interrupting unit interrupts the power of the error amplifier, the reference voltage generator, the PWM controller, the PFM controller, the backflow detector, the clock generator and the pulse generator in the idle section of the PFM mode.

\* \* \* \* \*